Oct. 6, 1964  E. L. REIBOLD ETAL  3,151,743
DISPLAY FIXTURE

Filed Nov. 20, 1961  4 Sheets-Sheet 1

INVENTORS
Elmer L. Reibold
Leon E. Litzelman
BY
John S. O'Brien
Attys.

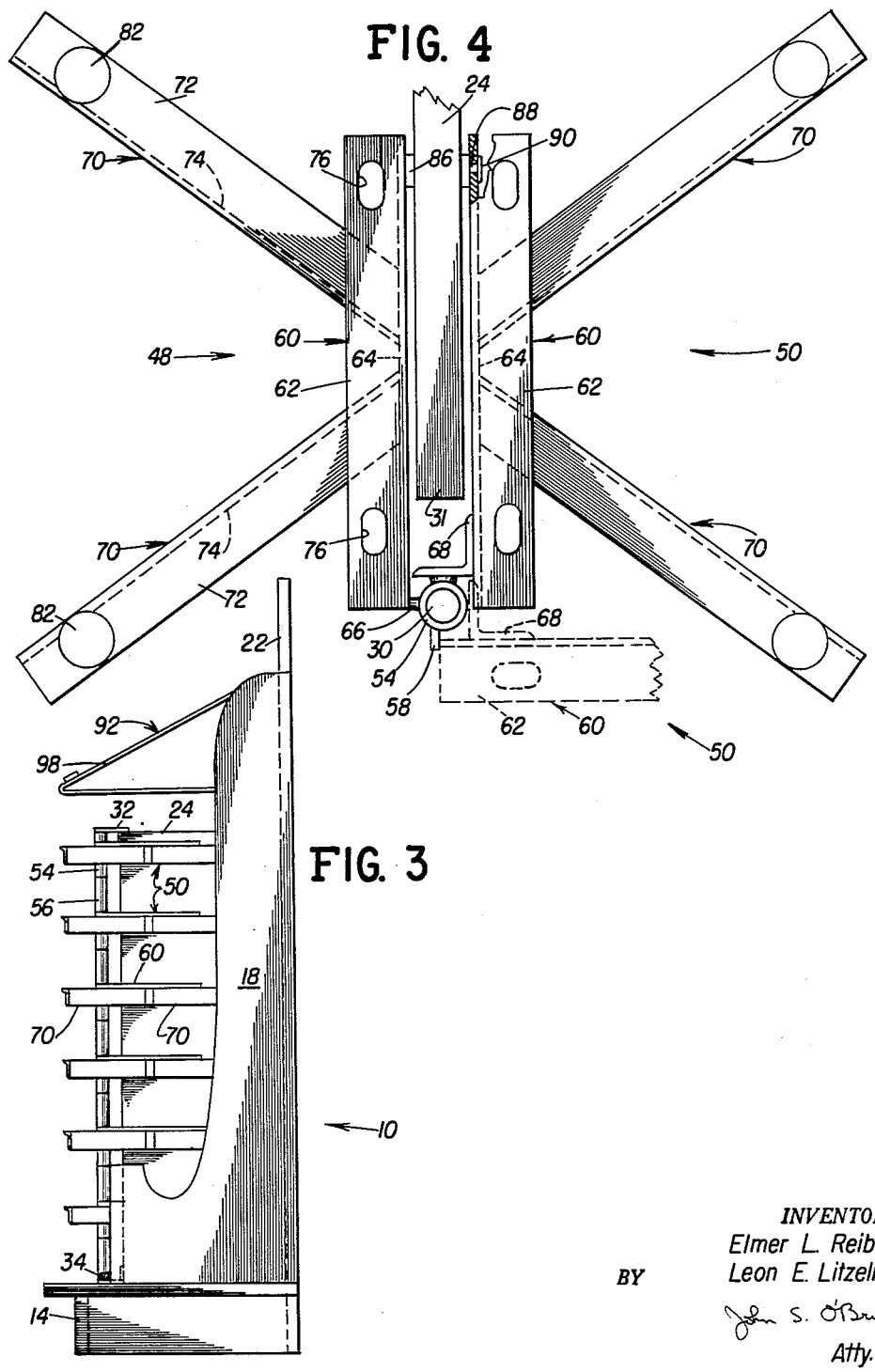

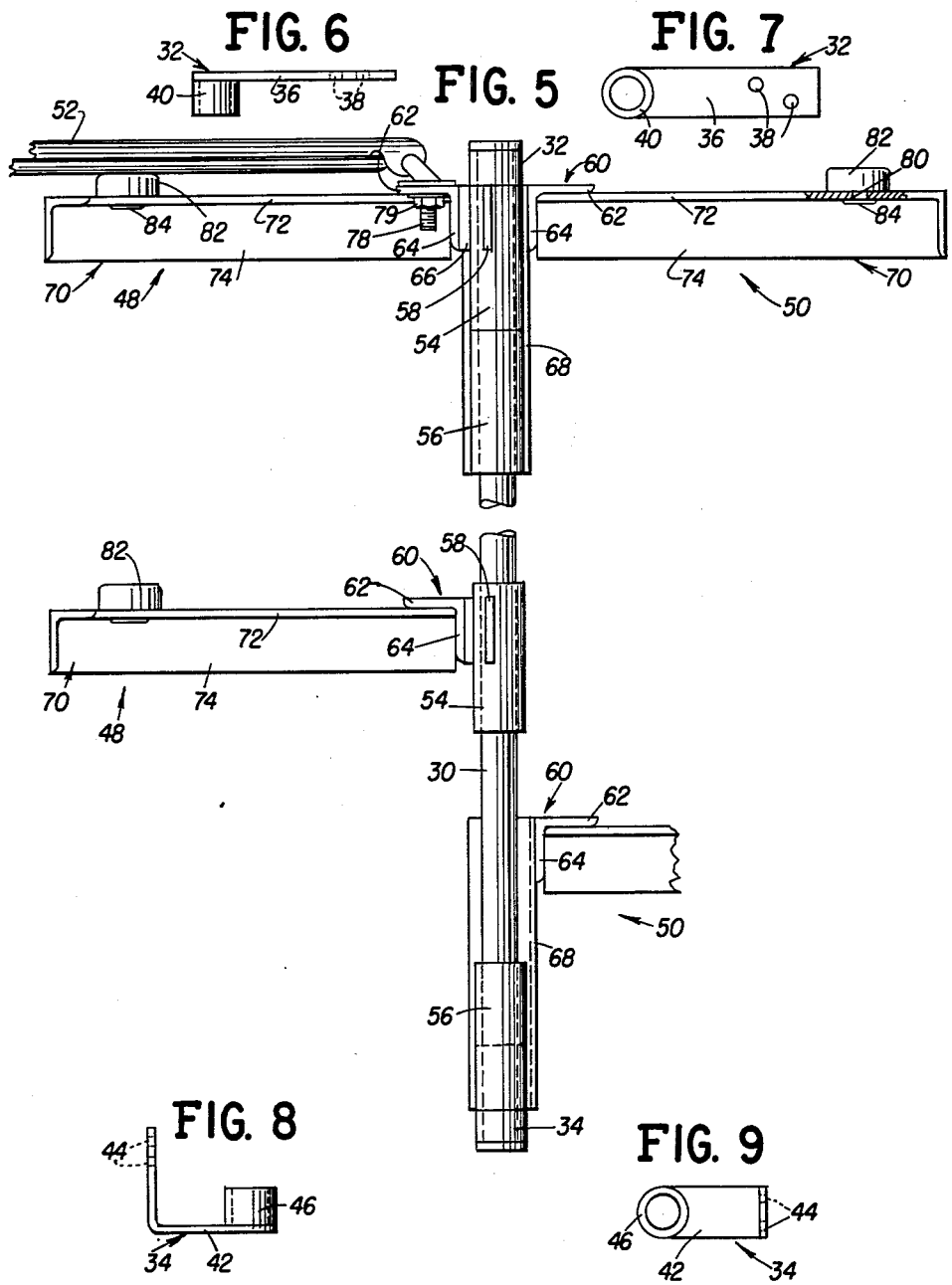

Oct. 6, 1964  E. L. REIBOLD ETAL  3,151,743
DISPLAY FIXTURE
Filed Nov. 20, 1961  4 Sheets-Sheet 4

INVENTORS
Elmer L. Reibold
Leon E. Litzelman
BY John S. O'Brien
Atty.

United States Patent Office 3,151,743
Patented Oct. 6, 1964

3,151,743
DISPLAY FIXTURE
Elmer L. Reibold, Park Ridge, and Leon E. Litzelman, Naperville, Ill., assignors, by mesne assignments, to E. L. Reibold Agency, Inc., Chicago, Ill., a corporation of Illinois
Filed Nov. 20, 1961, Ser. No. 153,434
4 Claims. (Cl. 211—13)

This invention relates to a fixture adapted for displaying merchandise. More particularly, the fixture is adapted for displaying hard goods and for selective withdrawal of the goods for examination.

Hard goods articles are commonly displayed for customer viewing and examination on stands, tables, racks and the like, especially the heavier and bulkier items. For example, various bathroom articles and accessories such as toilet seats and bathroom scales may be arranged on stands or fastened to walls or other supports. Such display methods and fixtures require excessive display space when it is desired to show one or more complete lines or styles of merchandise, and the displays may be poorly organized for stimulating sales. Alternatively, it may be necessary to feature only one or several items of a line, in order to conserve space and present an attractive display.

It is therefore an important object of the present invention to provide a display fixture which overcomes the prior disadvantages, and particularly, which affords an attractive full line display, conserves space, and provides for convenient viewing and examination by customers.

A particular object is to provide a fixture for displaying hard goods, especially heavier and bulkier articles.

Another object is to provide a fixture for supporting the merchandise in superimposed or stacked relation while affording a good view of the articles and enabling them to be withdrawn for closer examination.

An additional object is to provide a fixture for comparative or complementary display of two or more lines or styles of merchandise.

A further object is to provide a relatively simple, compact and economical display fixture which accomplishes the foregoing objects.

These and other objects, advantages, and functions of the invention will be apparent on reference to the specification and to the attached drawings illustrating preferred embodiments of the invention, in which like parts are identified by like reference symbols in each of the views, and in which:

FIG. 3 is a side elevational view thereof;

FIG. 4 is an enlarged top plan view of a pair of adjacent brackets or holders for the goods as mounted in the fixture, illustrating in phantom lines another position of one of the brackets;

FIG. 5 is an enlarged broken side elevational view with parts separated of a support and the brackets mounted thereon as employed in the embodiment of FIG. 1, illustrating the mounting of a toilet seat on one of the brackets;

FIG. 6 is an enlarged side elevational view of an upper support mount;

FIG. 7 is an enlarged bottom plan view thereof;

FIG. 8 is an enlarged side elevational view of a lower support mount;

FIG. 9 is an enlarged top plan view thereof;

The display fixture of the invention includes a base, a support mounted on the base, and a plurality of brackets or holders mounted on the support and adapted for mounting an article of merchandise on each of them. The brackets are mounted for swinging individual brackets out for examination of articles secured thereto.

Figure 1:
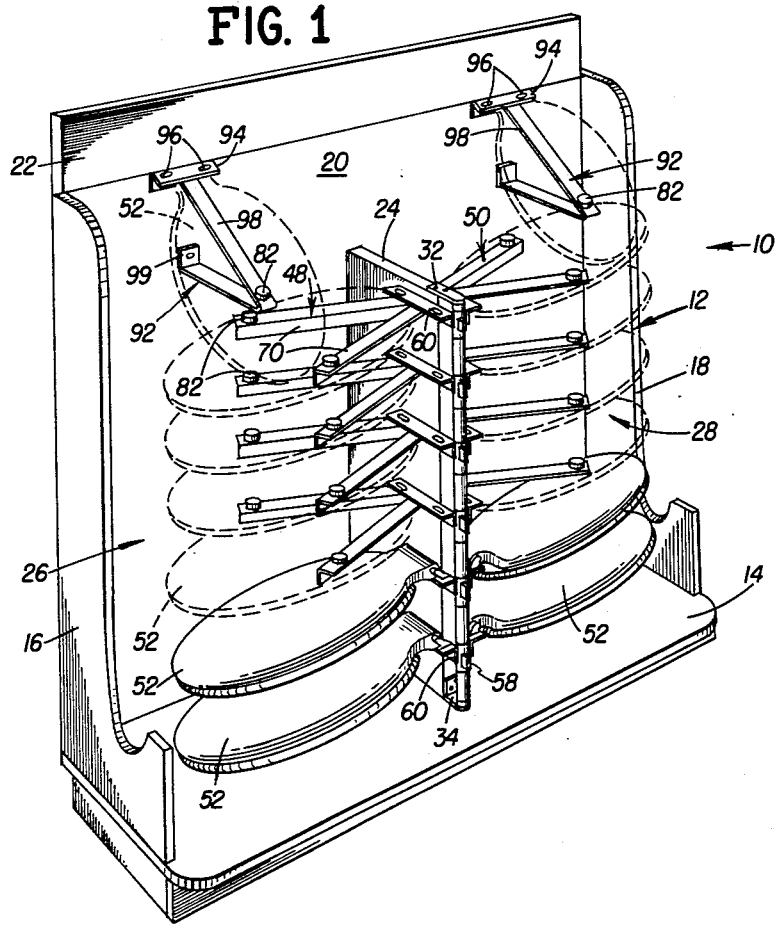
FIG. 1 is a perspective view of one embodiment of the new display fixture illustrating its use in a toilet seat display.
Figure 2:
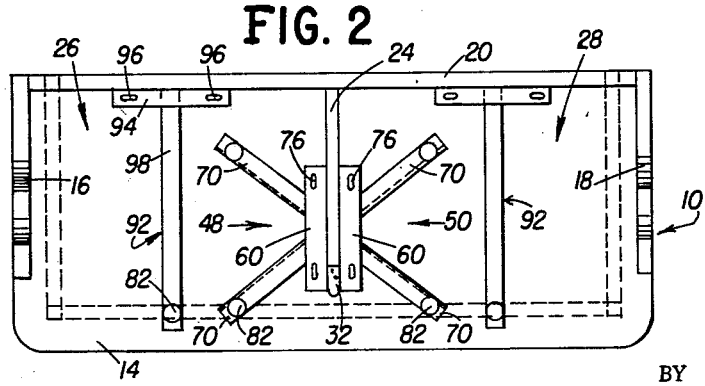
FIG. 2 is a top plan view thereof.

Referring in particular to FIGS. 1–3 of the drawings, one embodiment of the new display fixture is generally indicated by the number 10. The fixture includes a display stand 12 having a base 14, parallel upstanding side walls 16 and 18, a back wall 20, and a copy panel 22 extending upwardly therefrom. The display stand constitutes an open cabinet which enables the contents to be viewed from the top and from three sides. The stand is portable, and it may be moved about and adjusted as most convenient or desirable.

An upright divider panel 24 is centrally mounted on the base 14 and joined to the back wall 20, and it divides the stand into two compartments 26 and 28 on opposite sides thereof. An upright support rod or standard 30, visible in FIGS. 4 and 5, is mounted on the base 14 of the stand adjacent to and spaced from the front edge 31 of the divider panel 24. The rod is held in position by respective upper and lower mounts or brackets 32 and 34, as illustrated in FIGS. 1–3 and 5–9. The upper mount 32 includes a bar or strap 36 having a pair of openings 38 therethrough for mounting it on the upper edge of the divider panel 24, by screws or other suitable means. A collar or tube section 40 is secured to the bar 36, as by welding, and depends therefrom for receiving the upper end of the support rod 30 therein. Similarly, the lower mount 34 includes an angular bar or strap 42 having openings 44 in an upstanding part thereof. The lower mount is secured to the front edge 31 of the divider panel 24 at the base thereof, by screws or the like inserted through the openings 44, and the bottom of the mount is supported by the base 14 of the stand. An upstanding collar 46 is fixed on the bar 42, and it receives the lower end of the support rod 30 therein.

A plurality of merchandise mounting brackets or holders 48 and 50 are pivotally or rotatably mounted on the support rod 30. As will be seen particularly from FIGS. 1, 4 and 5, the brackets preferably are mounted in pairs of adjacent horizontal brackets 48 and 50 disposed at the same elevation, and the pairs are in superimposed or stacked relation. The brackets in one pair have been moved apart in FIG. 5 for illustrative purposes. One bracket 48 in each pair is initially disposed adjacent one side of the divider panel 24, in the compartment 26 on that side. The other bracket 50 is disposed on the opposite side of the panel, in the compartment 28 on that side.

In the illustrative display, a toilet seat 52 is mounted on each of the brackets 48 and 50, and it will be evident that other hard goods such as bathroom scales may be displayed in like manner. The fixture is adapted for displaying one line or style of toilet seats on one group or stack of brackets 48 disposed in one compartment 26, and for displaying a second line or style on the second group of brackets 50 disposed in the second compartment 28. The toilet seats 52 on adjacent brackets 48 and 50 may be displayed in the same or matching colors, or in other ways which will facilitate examination and comparison by the customer to stimulate sales.

Referring particularly to FIGS. 4 and 5, the mounting brackets 48 and 50 include respective tubular spacer sleeves 54 and 56 which are pivotally or rotatably mounted on the support rod 30. The sleeves of the several brackets are superimposed on each other over the length of the support rod, and the sleeve 54 of one bracket 48 is superimposed on the sleeve 56 of the second bracket 50 in each adjacent pair of brackets. A stop or abutment bar 58 is fixed on the initially front surface of the upper sleeve 54 in each pair, as by welding, for a purpose to be described.

Each of the brackets 48 and 50 includes an angle bar ledge or mounting plate 60 secured to its sleeve 54 or 56. Each ledge includes an outwardly projecting horizontal mounting flange 62 and an integral depending flange 64. The depending flange of one bracket 48 in each pair is directly connected to the upper sleeve 54, as by a weld 66. The depending flange of the second bracket 50 in each pair is secured to a spacing angle bar 68 which is in turn secured to the lower sleeve 56, in both instances by welding.

Each of the mounting brackets 48 and 50 includes a pair of horizontal divergent supporting arms 70 which are secured to the respective ledges 60 as by welding and extend outwardly therefrom. Each of the arms includes a horizontal supporting flange 72 and an integral depending flange 74.

The brackets 48 and 50 are constructed for securing articles thereto, and in the illustrative embodiment, are adapted particularly for holding and supporting the toilet seats 52. A pair of openings 76 is provided in the mounting flange 62 of each of the ledges 60, and the openings are spaced apart a distance to receive a pair of toilet seat bolts 78 (FIG. 5) for securing a seat to a ledge thereby. Fastening nuts 79 are threaded on the bolts below the mounting flange. Similarly, the openings may receive fastening means for holding other articles, and the construction may be varied if desirable to accommodate other articles.

The supporting flanges 72 of the arms 70 preferably are provided with openings 80 for mounting cushions or pads 82 thereon, by means of pins 84 or the like inserted through the openings. In this manner, the toilet seats 52 are secured and supported on the brackets 48 and 50, and they are attractively mounted. As seen in FIG. 1, the ledges 60 for the most part, and the arms 70, are covered and obscured by the seats while performing their functions.

When it is desired to closely examine the articles on display, they are pulled out individually from their initial positions, wherein the brackets 48 and 50 lie adjacent the opposite sides of the divider panel 24. Referring to FIG. 4, when either of the brackets 48 and 50 in a pair is in its outer or forward position, the stop 58 connected to the bracket 48 is adjacent the ledge 60 of the remaining bracket. This relationship is illustrated by the phantom outer position of the bracket 50 in FIG. 4 relative to the remaining bracket 48. In this case, when the other bracket 48 subsequently is swung out from its initial position, it acts through the stop 58 to return the outwardly extending bracket 50 to its initial position, illustrated in full lines. When the bracket 50 is once more swung out, the stop 58 engages the other bracket 48 to return it to the initial position illustrated. The merchandise is prevented from banging together by this construction while being displayed for convenient examination and comparison.

Additional cushioning means may be provided if desired, in the form of resilient bumpers 86 illustrated in FIG. 4. For this purpose, an opening 88 may be provided adjacent the inner end of each depending ledge flange 64, and a pin 90 or other suitable fastening means for the bumper may be inserted therethrough.

It will be noted from FIGS. 1, 3 and 5 that the bracket sleeves 54 and 56 provide spacers for the ledges 60 and arms 70 on which the articles are supported. Additional spacers may be inserted between the sleeves for increasing the distances between the superimposed supporting members to accommodate articles of greater depth. Thus, while the fixture as illustrated is particularly adapted for displaying a number of relatively flat articles of moderate depth such as the toilet seats 52 within a suitable display height, a lesser number of articles of greater depth may also be displayed advantageously. Alternatively, shorter sleeves 54 and 56 may be employed for displaying a greater number of articles of lesser depth.

The display fixture 10 also includes a spaced pair of fixed upper mounting brackets 92 (FIGS. 1–3) which project forwardly from the back wall 20. A display seat 52 is mounted on each bracket and is inclined downwardly over the seats 52 pivotally mounted in the respective compartments 26 and 28. Two of the articles may be featured in this manner, and the appearance of the display is enhanced.

Each of the fixed brackets 92 includes an angular ledge 94 secured to the back wall 20, and having a downwardly inclined mounting flange provided with a pair of openings 96 for receiving seat bolts or other fastening means. Each ledge is secured to one end of an angular supporting strap 98 having an inner upstanding flange 99 secured to the back wall. A cushion 82 may be secured on each strap to protect the articles supported thereon.

Figure 10:
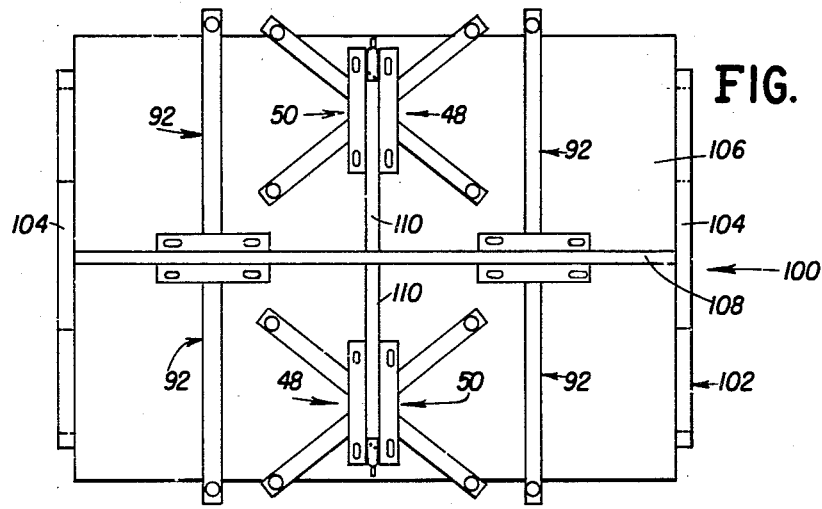
FIG. 10 is a top plan view of a second embodiment of the display fixture, similar to the preceding embodiment.

FIG. 10 illustrates a convenient and compact display fixture 100 having twice the capacity of the preceding embodiment. The displays are arranged back to back and are viewable from all sides. A display stand 102 includes a supporting framework 104, a base 106 mounted thereon, and a central longitudinal panel 108 mounted on the base. The central panel 108 divides the stand into two sections, and it is employed for the same purposes as the back panel 20 in the preceding embodiment. Divider panels 110 on opposite sides of the central panel divide the sections of the stand 102 into compartments in like manner to the panel 24 of the preceding embodiment. The same movable mounting brackets 48 and 50 and fixed brackets 92 are employed on each side of the central panel 108.

The fixture 100 is well adapted for locating it anywhere in a shop or store, to attract attention and furnish increased shopping convenience. The compact nature of the fixture enables it to be prominently located in aisles and in other central areas.

Figure 11:
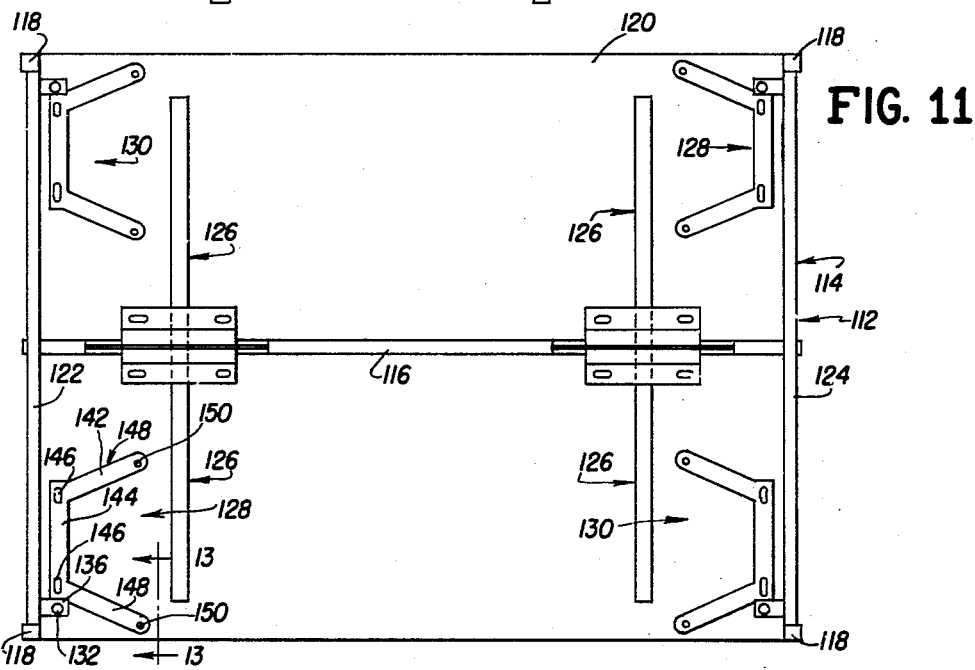
FIG. 11 is a top plan view of a third embodiment of the display fixture.
Figures 12, 13:
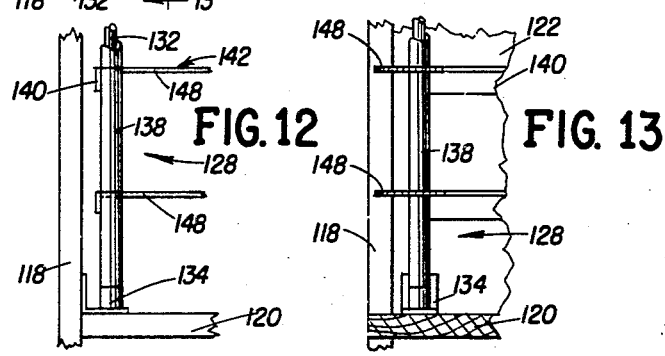
FIG. 12 is an enlarged fragmentary side elevational view taken at one corner thereof.
FIG. 13 is an enlarged fragmentary side elevational and sectional view taken on line 13—13 of FIG. 11.

FIGS. 11–13 illustrate a further embodiment of the display fixture, which provides a further advantageous comparative arrangement of the articles being displayed. The display fixture 112 is similar to the fixture of FIG. 10, in that it includes a stand 114 having a central longitudinal wall 116 which divides the stand into two sections facing in opposite directions. The stand 114 includes legs 118 on which are mounted a base 120 and opposed side walls 122 and 124. Fixed mounting brackets 126 are mounted at the upper extremity of the central wall 116 and extend outwardly therefrom in both directions, similarly to the preceding embodiment.

The fixture 112 includes movable mounting brackets 128 and 130 at the opposite forward corners of each section of the stand. As illustrated in FIGS. 12 and 13, a plurality of individual brackets are pivotally mounted in superimposed spaced relation on a support rod 132. The rod is mounted in a lower mount 134, and an upper mount 136, shown in FIG. 11.

Each mounting bracket includes a tubular sleeve 138 pivotally mounted on the support rod 132. A bar 140 is welded thereto, and also to an outwardly extending support 142 for an article of merchanise. The support includes a ledge portion 144 having a pair of spaced apart openings 146 therein. A pair of arms 148 are integral with the ledge portion and diverge outwardly therefrom. The arms include openings 150 adjacent their ends for securing cushions or the like thereto.

Toilet seats or other hard goods articles are mounted on the brackets 128 and 130, and secured thereto by inserting bolts or other fastening means through the openings 146, in the same manner as in the preceding embodiments. The brackets initially are disposed with their ledge portions 144 adjacent the side walls 122 and 124 of the stand, as illustrated in FIG. 11. The merchandise is then arranged in spaced stacked relation within the sections of the stand. Articles may be arranged for comparison on the respective brackets 128 and 130 at the same elevation. For closer examination, a bracket is swung out so that the article projects forwardly from the display stand. The articles are readily returned to their initial positions and others pulled out for examination, so that one or more complete lines may be examined rapidly and conveniently.

The invention thus provides a display fixture which overcomes various shortcomings of the prior display methods and fixtures. The fixture provides an attractive display, presents one or more full lines of merchandise to the viewer, occupies a minimum of space, and affords a maximum of convenience in examination.

It will be apparent that various changes and modifications may be made in the construction and arrangement of the components of the invention. It is intended that such changes and modifications be included within the scope of the appended claims.

We claim:

1. A fixture adapted for displaying hard goods and for selective withdrawal of the goods for examination, which comprises a portable display stand, an upright divider panel mounted on said stand, an upright support rod mounted on said stand adjacent an outer end of said panel, a plurality of brackets mounted on said support rod, said brackets being mounted in superimposed pairs of adjacent brackets respectively disposed initially adjacent opposite sides of said panel, said brackets each including a sleeve pivotally mounted on said support rod, a ledge mounted on said sleeve, and a pair of divergent arms extending from said ledge, said ledge having openings therein for securing a hard goods article thereto, said arms being adapted for supporting an article secured to said ledge, said sleeves of the several brackets being superimposed on each other, and stop means on said brackets for interengaging said adjacent brackets, whereby said brackets may be swung out from their initial positions about said support rod, individually for examination of articles secured thereto, and when one bracket is swung out for examination, the adjacent bracket is restored to its initial position.

2. A fixture adapted for displaying hard goods and for selective withdrawal of the goods for examination, which comprises a base, a support rod mounted on said base, a plurality of brackets mounted on said support rod, said brackets each including a sleeve pivotally mounted on said support rod, a ledge mounted on said sleeve, means defining openings in said ledge, said openings being disposed to receive a pair of toilet seat bolts for securing the seat to the ledge thereby, and an arm extending from said ledge, said arm being adapted for supporting a toilet seat secured to said ledge, whereby said brackets may be swung about said support rod individually for examination of seats mounted thereon.

3. A fixture adapted for displaying hard goods and for selective withdrawal of the goods for examination, which comprises a display stand, an upright support rod mounted on said stand, a plurality of brackets mounted on said support rod in superimposed pairs of adjacent brackets, said brackets each including a sleeve pivotally mounted on said support rod, a ledge mounted on said sleeve, and an arm extending from said ledge, said ledge having openings therein for securing a hard goods article thereto, said arm being adapted for supporting an article secured to said ledge, and stop means on said brackets for interengaging said adjacent brackets, whereby said brackets may be swung about said support rod individually for examination of articles secured thereto, and when one bracket is swung about said support rod for examination, the adjacent bracket is restored to an initial position.

4. A fixture adapted for displaying hard goods and for selective withdrawal of the goods for examination, which comprises a base, an upright divider mounted on said base, an upright support rod mounted on said base adjacent said divider, and a plurality of brackets mounted on said support rod in superimposed pairs of adjacent brackets, said brackets each including a sleeve pivotally mounted on said support rod, a ledge mounted on said sleeve, means defining openings in said ledge, said openings being disposed to receive a pair of toilet seat bolts for securing the seat to the ledge thereby, and an arm extending from said ledge, said arm being adapted for supporting a toilet seat secured to said ledge, said ledges of each pair of brackets being disposed initially adjacent opposite sides of said divider, whereby said brackets may be swung about said support rod individually with said ledges swinging out from said divider for examination of seats mounted thereon.

References Cited in the file of this patent

UNITED STATES PATENTS

| | | |
|---|---|---|
| D. 173,783 | Beversdorf | Jan. 4, 1955 |
| 793,451 | Lindsay | June 27, 1905 |
| 829,967 | Jefferis | Sept. 4, 1906 |
| 1,581,352 | Kuen | Apr. 20, 1926 |
| 2,615,662 | Sannebeck | Oct. 28, 1952 |
| 2,633,997 | Johnson | Apr. 7, 1953 |
| 2,644,660 | Dudley | July 7, 1953 |
| 2,937,381 | Manas | May 24, 1960 |
| 2,947,424 | White | Aug. 2, 1960 |